United States Patent Office 3,251,855
Patented May 17, 1966

---

3,251,855
DERIVATIVES OF PHTHALIMIDE
Edward L. Schumann, Kalamazoo, Mich., assignor to The Upjohn Company, Kalamazoo, Mich., a corporation of Delaware
No Drawing. Filed Feb. 17, 1964, Ser. No. 345,086
3 Claims. (Cl. 260—326)

This invention relates to novel compounds and methods for their preparation. It is particularly directed to novel N - (2 - bromoethoxy)phthalimide and 1,2 - bis(phthalimidooxy)ethane and to novel processes for their preparation.

N-(2-bromoethoxy)phthalimide of the Formula I

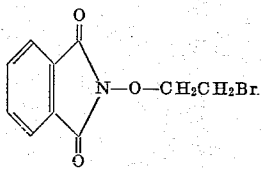

is prepared by reacting the known compound N-hydroxyphthalimide of the formula

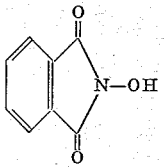

with a large excess of ethylene dibromide (the molar ratio of N-hydroxyphthalimide to ethylene dibromide preferably being of the order of from about 1:5 to about 1:20) in the presence of an acid acceptor, for example, sodium hydroxide, potassium hydroxide, pyridine, triethylamine, etc. The reaction is advantageously carried out at elevated temperatures, preferably between about 75 and about 125° C., in the presence of an inert organic solvent, for example, dimethylformamide and the like. Ordinarily the reaction is substantially complete within about ½ to about 2 hours, depending on the reaction temperature employed. The desired N-(2-bromoethoxy) phthalimide is isolated from the reaction mixture by conventional procedures, e.g., by pouring the reaction mixture into water, in which case it separates as a solid and is isolated by filtration. The material thus obtained can be purified, if desired, by conventional procedures such as recrystallization and the like.

1,2-bis(phthalimidooxy)ethane of the Formula II

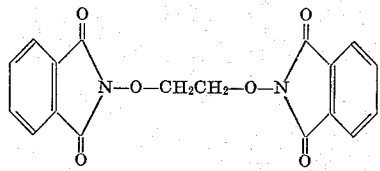

is prepared by reacting N-hydroxyphthalimide with ethylene dibromide (the molar ratio of N-hydroxyphthalimide to ethylene dibromide preferably being of the order of from about 2:1 to about 1:2) in the presence of an acid acceptor, for example, sodium hydroxide, potassium hydroxide, pyridine, triethylamine, etc. Otherwise, the reaction conditions, namely, temperature, time and inert solvents, as well as methods of isolation and purification employed in the production of 1,2-bis(phthalimidooxy)ethane (II) are the same as those described above for the preparation of N-(2-bromoethoxy)phthalimide (I).

The novel compounds of Formulae I and II, above, exhibit pharmacological activity. Both of these compounds are central nervous system depressants and can be used for producing sedation in mammals and animals, e.g., mice, rats and birds. In addition, N-(2-bromoethoxy)phthalimide (I) possesses activity as an anti-inflammatory agent which makes it useful in mammals and animals, e.g., mice, rats and birds, in the treatment of various inflammatory conditions of the skin, eyes, respiratory tract, bones and internal organs. Besides its central nervous system depressing activity, 1,2-bis(phthalimidooxy)ethane (II) is active as an anorexigenic agent and is useful in arresting or alleviating hunger in the same categories of animals as those set forth above.

N-(2-bromoethoxy)phthalimide is also useful as a chemical intermediate. For example, it can be reacted with N-hydroxyphthalimide to obtain 1,2-bis(phthalimidooxy)ethane. Although an excess of either reactant can be employed, there is no particular advantage in doing so. Accordingly, it is preferred to employ the reactants in substantially stoichiometric amounts, i.e., equimolar amounts. The reaction can be carried out in the presence of an inert organic solvent, e.g., dimethylformamide, and an acid acceptor of the kind given above.

The invention may be more fully understood by the following examples which embody the best manner known for carrying out the invention.

*Example 1.—N-(2-bromoethoxy)phthalimide*

A solution of 1128 g. (6 moles) of ethylene dibromide and 98 g. (0.6 mole) of N-hydroxyphthalimide in 1.5 l. of dimethylformamide was treated with 121 g. (1.2 moles) of triethylamine, stirred and warmed slowly to about 90° C. during a period of about 1 hour. The solution was maintained at about 90° C. for about ½ hour, then cooled and poured into about 6 l. of ice water. The precipitated oil crystallized on standing; recrystallization from absolute ethanol gave 80.5 g. (50% yield) of the pure product, N-(2-bromoethoxy)phthalimide, which melted at 98 to 100° C. (uncorrected).

*Analysis.*—Calcd. for $C_{10}H_8BrNO_3$: C, 44.47; H, 2.98; N, 5.19; Br, 29.59. Found: C, 44.93; H, 2.84; N, 5.14; Br, 28.86.

*Example 2.—1,2-bis(phthalimidooxy)ethane*

A solution of 49 g. (0.3 mole) of N-hydroxyphthalimide and 56.5 g. (0.3 mole) of ethylene dibromide in 750 ml. of dimethylformamide was treated with 60.5 g. (0.6 mole) of triethylamine, stirred and warmed to about 90° C. for a period of about 1 hour. The solution was maintained at about 90° C. for about ½ hour, cooled and poured into about 3 l. of ice water to form a solid precipitate. Recrystallization of this material from dimethylformamide gave 12 g. (23% yield) of pure product, 1,2-bis(phthalimidooxy)ethane, with a melting point of 252 to 253° C. (uncorrected).

*Analysis.*—Calcd. for $C_{18}H_{12}N_2O_6$: C, 61.36; H, 3.43; N, 7.95. Found: C, 61.62; H, 3.20; N, 8.17.

*Example 3.—1,2-bis(phthalimidooxy)ethane*

Following the procedure of Example 2, but replacing ethylene dibromide with 0.3 mole of N-(2-bromoethoxy) phthalimide, there is obtained 1,2-bis(phthalimidooxy) ethane which is identical with the product of Example 2.

I claim:
1. A compound of the formula

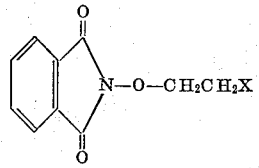

wherein X is selected from the group consisting of bromine and
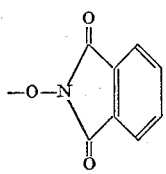
2. N-(2-bromoethoxy)phthalimide.
3. 1,2-bis(phthalimidooxy)ethane.
References Cited by the Examiner
Bauer et al.: Jour. Org. Chem., vol. 28, pp. 1604–1608, June 12, 1963.
McKay et al.: Can. Jour. of Chem. vol. 38, 1960, pp. 343–350.
HENRY R. JILES, *Acting Primary Examiner.*
MARY O'BRIEN, *Assistant Examiner.*